United States Patent [19]

Borsuk et al.

[11] 4,063,351

[45] Dec. 20, 1977

[54] ELECTRICAL CONNECTOR ASSEMBLY APPARATUS AND METHOD OF CONNECTOR FABRICATION

[75] Inventors: Leslie M. Borsuk, Los Alamitos; Randall H. Anderson; Emerson A. Grimsby, both of Brea; Robert F. Malsberger, Newport Beach, all of Calif.

[73] Assignee: International Telephone and Telegraph Corporation, New York, N.Y.

[21] Appl. No.: 752,445

[22] Filed: Dec. 20, 1976

[51] Int. Cl.² ........................ H02G 15/08; B23P 21/00

[52] U.S. Cl. ........................................ 29/629; 29/450; 29/235; 29/754; 29/717

[58] Field of Search ................. 29/629, 450, 752, 754, 29/717, 714, 747, 235

[56] References Cited

U.S. PATENT DOCUMENTS

| | | | |
|---|---|---|---|
| 2,657,454 | 11/1953 | Huyett | 29/754 |
| 2,916,811 | 12/1959 | Whitecar | 29/235 |
| 3,955,414 | 5/1976 | Anderson | 29/235 |

*Primary Examiner*—C.W. Lanham
*Assistant Examiner*—Daniel C. Crane
*Attorney, Agent, or Firm*—A. Donald Stolzy

[57] ABSTRACT

A resilient insulator having a hole therethrough is supported and a first reciprocable mechanism is provided to telescope a hollow cylinder into the insulator hole to stretch the hole to a position larger in cross section. A second reciprocable mechanism is provided to telescope an insulated rod partway into the cylinder and insulator. A third electrically operable mechanism responsive to a contact touching one end of the rod is provided to actuate one of the first and second mechanisms to relieve the insulator in a manner to allow the same to hold the contact fixedly in inward radial compression in the insulator hole.

4 Claims, 12 Drawing Figures

FIG. 5
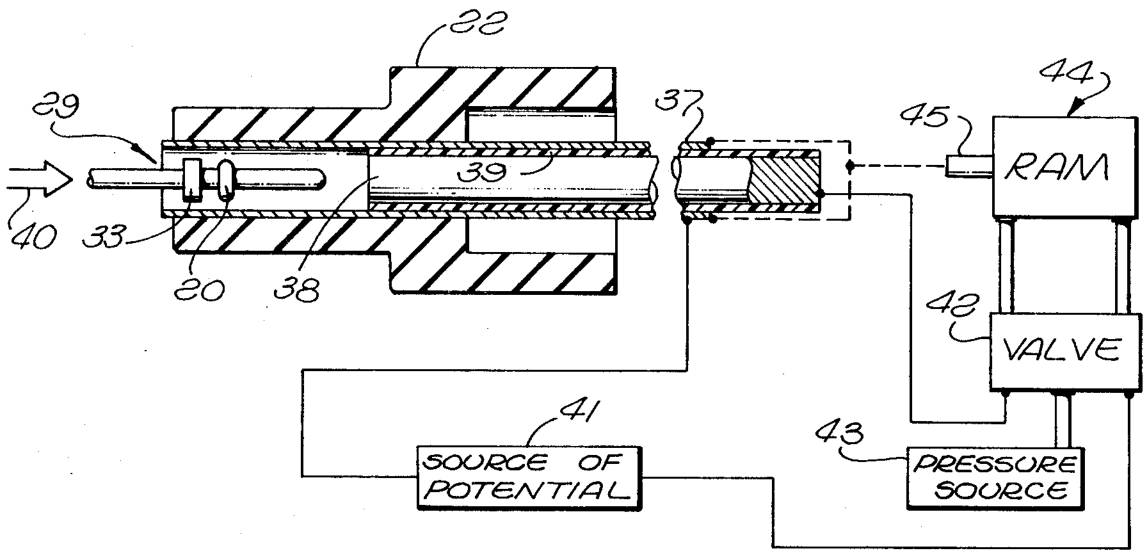
FIG. 6
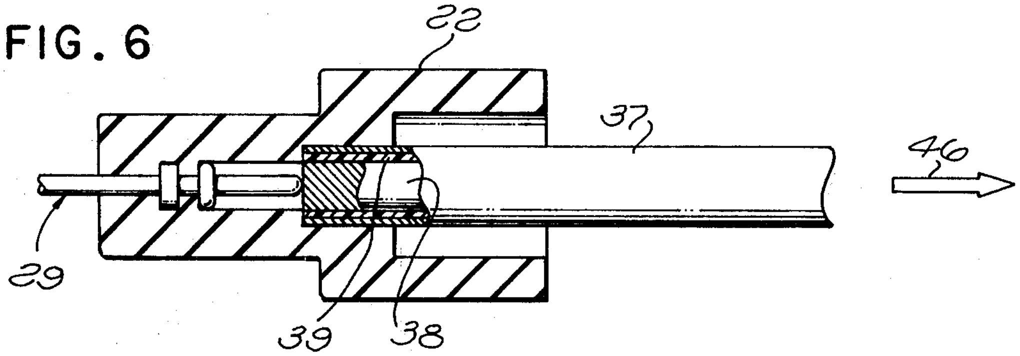
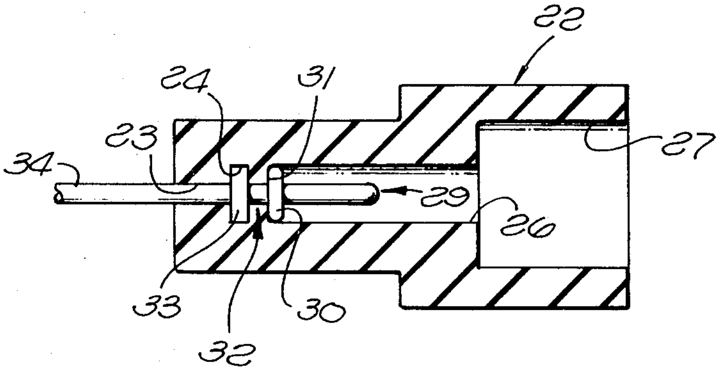
FIG. 7

ELECTRICAL CONNECTOR ASSEMBLY APPARATUS AND METHOD OF CONNECTOR FABRICATION

BACKGROUND OF THE INVENTION

This invention relates to the electrical connector fabrication art, and more particularly to a method of and apparatus for assembling connector contacts and insulators.

In the past, connectors have been made as disclosed in U.S. Pat. No. 3,955,414 issued May 11, 1976.

SUMMARY OF THE INVENTION

The present invention involves improvements upon the apparatus described in the above-mentioned patent. The said improvements fall into two categories as follows:

1. The rearrangement of cylinders and pistons to allow for the addition of a positive contact insertion location stop.

2. An electrical circuit integral with the stops which precludes cycling of the machine unless the contacts are accurately located against the stops.

With the present invention, the sequence of operation is partially as described in the said patent. With the present invention, opposing pistons and associated cylinders first clamp the connector insulator between them. A slidable pin extends forward and through the bore of the insulator. An opposing sleeve is then extended through the bore from the opposite side, around the pin. The pin is retracted, an insulated metallic stop is extended (by use of a tandem piston) through the sleeve to an accurate location within the bore of the insulator. The electrical contact is inserted within the sleeve positioning it against the stop in order to obtain an accurate insertion location within the connector insulator. Various quantities of components may be used.

The above-described insulated metallic stops are themselves electrical contacts. They are wired into the circuit which electrically controls the sequencing of the apparatus. In addition, the above-mentioned sleeves are also electrically connected to the same circuit. The connector contact is used as a third element in this electrical circuit. As the contacts are inserted within the sleeve adjacent to the stops, they will touch both components simultaneously creating an electrical short from the stop, through the contact, to the sleeve. The control circuit within the apparatus may be a digital logic circuit, if desired, including "AND gates." When all contacts are inserted into the sleeves and positioned properly against the stops simultaneously, the logic circuit will be completed and the machine will continue its cycling. At this point in time, the sleeves will retract from the bores of the insulator allowing the insulator to grip shoulders on the contacts; then the stops will retract from the bores of the insulator completing the assembly of the connector. It should be noted that this apparatus can be built for connectors of any quantity of contacts.

The electrical digital logic circuit is constructed such that all contacts, whatever the quantity that the apparatus is intended to assemble, must simultaneously be located in the proper position. If not, further cycling of the machine will be precluded until the contacts are so positioned.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 5 is a diagrammatic view of an electrical connector contact and insulator with apparatus for assembling the same;

FIG. 6 is a side elevational view, partly in section, illustrating still another step in the method of the present invention;

FIG. 7 is a sectional view, partly in elevation, of an electrical connector contact and insulator assembly;

DESCRIPTION OF THE PREFERRED EMBODIMENT

Figure 1:
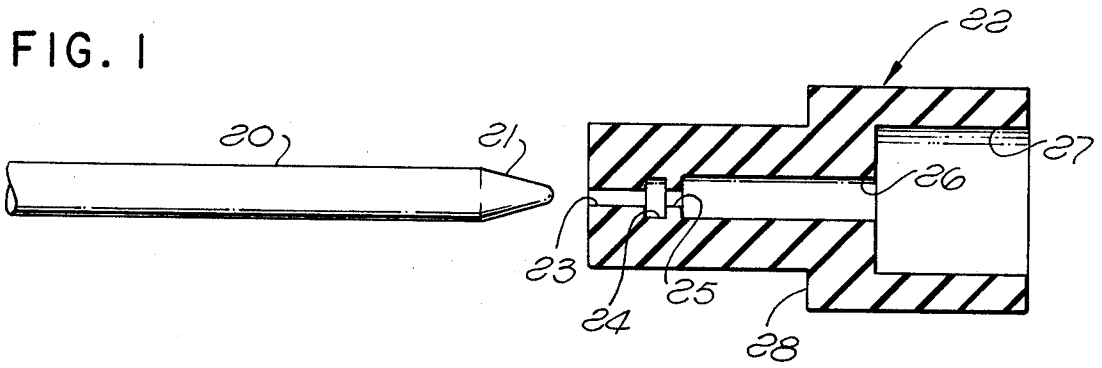
FIG. 1 is a side elevational view, partly in section, illustrating one step of the method of the present invention.
Figure 2:
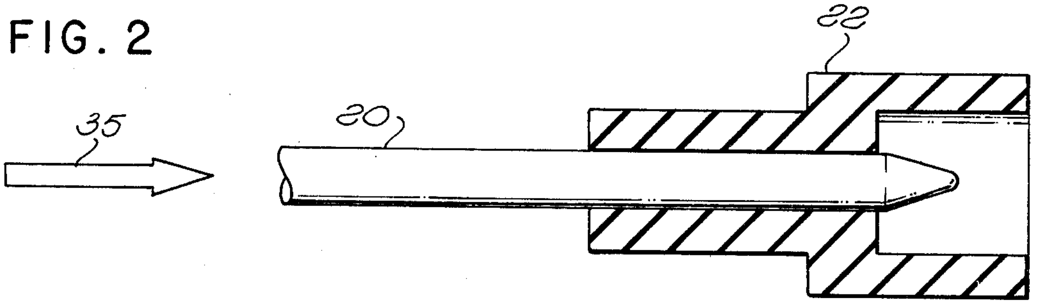
FIG. 2 is a side elevational view, partly in section, illustrating another step of the method of the present invention.
Figure 3:
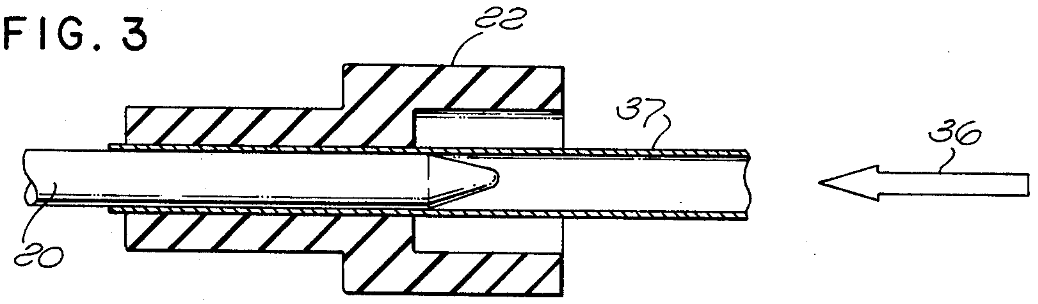
FIG. 3 is a side elevational view, partly in section, illustrating a third step of the method of the present invention.

In the drawings in FIG. 1, one step of the method of the present invention is illustrated including a shaft 20 having a frustoconical surface 21 which is pressed into a resilient insulator 22 in bores 23, 24, 25, 26 and 27. Insulator 22 has a shoulder 28 external thereof. As shown in FIG. 7, when a contact 29 is assembled with insulator 22, a flange 30 integral with contact 29 abuts a right-hand surface 31 of a flange 32 of insulator 22 which partially divides bores 24 and 26. A flange 33, also integral with contact 29, occupies the entire interior of bore 24. The left end 34 of contact 29 may be electrically connected to some other conductor, as desired. In any event, it fills insulator bore 23. As shown in FIG. 2, the next step in the method of the present invention, the shaft 20 is inserted through bores 23, 24, 25 and 26 to, for example, the location shown in FIG. 2 and in the direction of arrow 35 therein. Then, from the opposite direction as indicated by arrow 36 in FIG. 3, a conductive cylinder 37 is slipped over shaft 20 between shaft 20 and insulator 22 to the position shown in FIG. 3.

Figure 4:
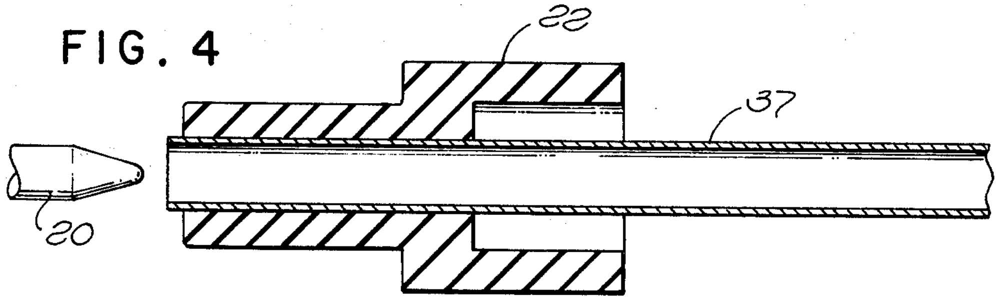
FIG. 4 is a side elevational view, partly in section, illustrating a fourth step of the method of the present invention.

As shown in FIG. 4, shaft 20 is then removed from the hollow interior of cylinder 37. As shown in FIG. 5, a metal rod 38 with insulation 39 therearound is slidably positioned inside cylinder 37. In this case, the left end of rod 38 is especially located so that contact 29 is seized by insulator 22 in the position shown in FIG. 7 when contact 29 is inserted in the direction of arrow 40 in FIG. 5 into the hollow interior of cylinder 37 until the right end of contact 29 touches rod 38.

Another apparatus is shown in FIG. 5 for sequencing the operation. A source of potential 41 is connected from cylinder 37 to a solenoid valve 42. A pressure source 43 is connected through valve 42 to a ram 44 that controls the position of cylinder 37. Valve 42 is energized when the right end of contact 29 touches the left end of rod 38 and, simultaneously, flanges 30 and/or 33 of contact 29 touch the cylinder 37. In this case, the output shaft 45 of ram 44 retracts cylinder 37 to the right, as viewed in FIGS. 5 and 6. This then leaves contact 29 in radial compression in insulator 22 as shown in FIG. 6. Cylinder 37, rod 38 and insulator 39 are removed from insulator 22 in the direction of arrow 46 in FIG. 6 so that the assembly of contact 29 and insulator 22 appears as indicated in FIG. 7.

Figure 8:
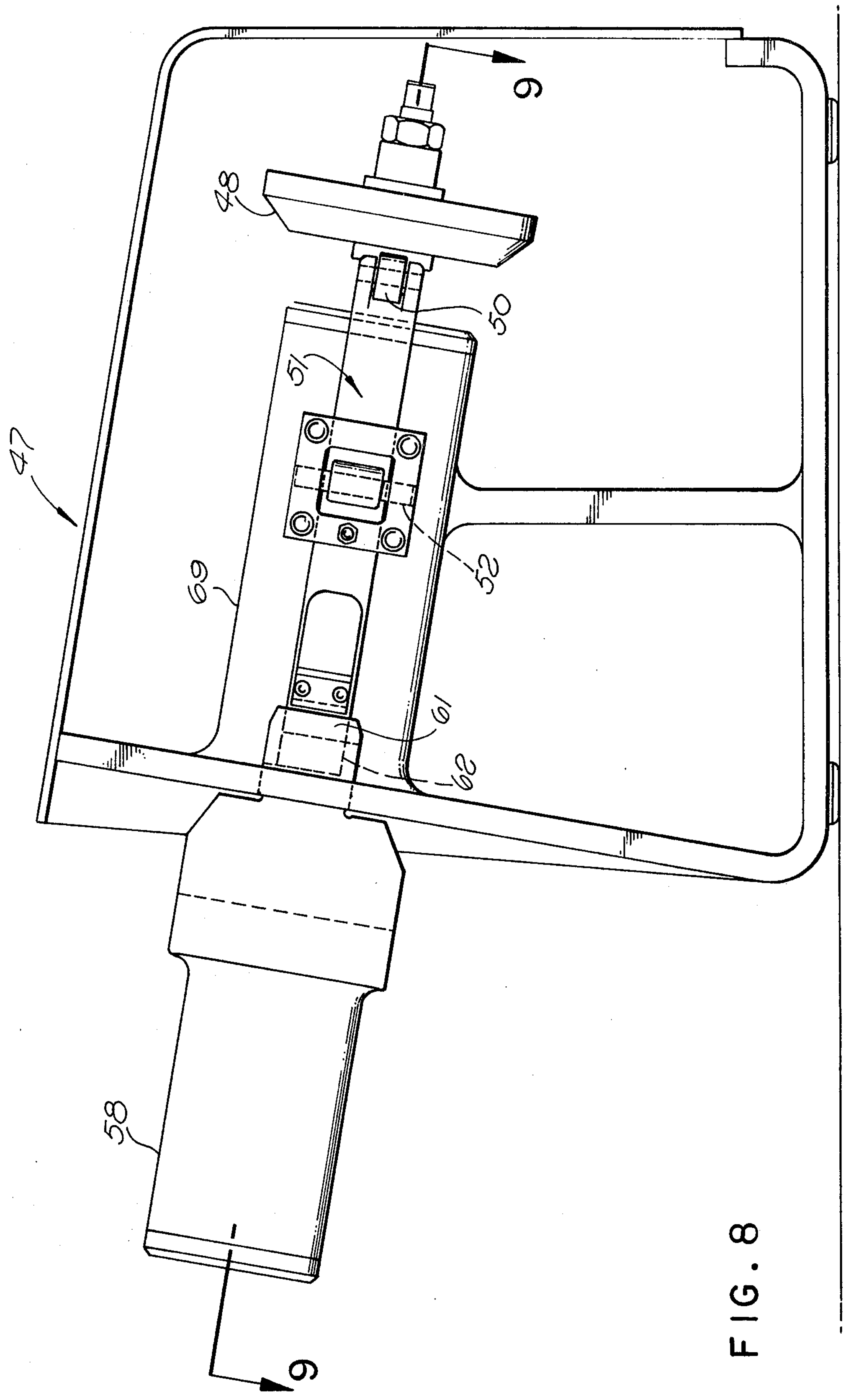
FIG. 8 is a side elevational view of apparatus for assembling the contact and insulator shown in FIG. 7.

The method of the present invention described hereinbefore may be performed by apparatus 47 shown in FIG. 8.

Figure 9:
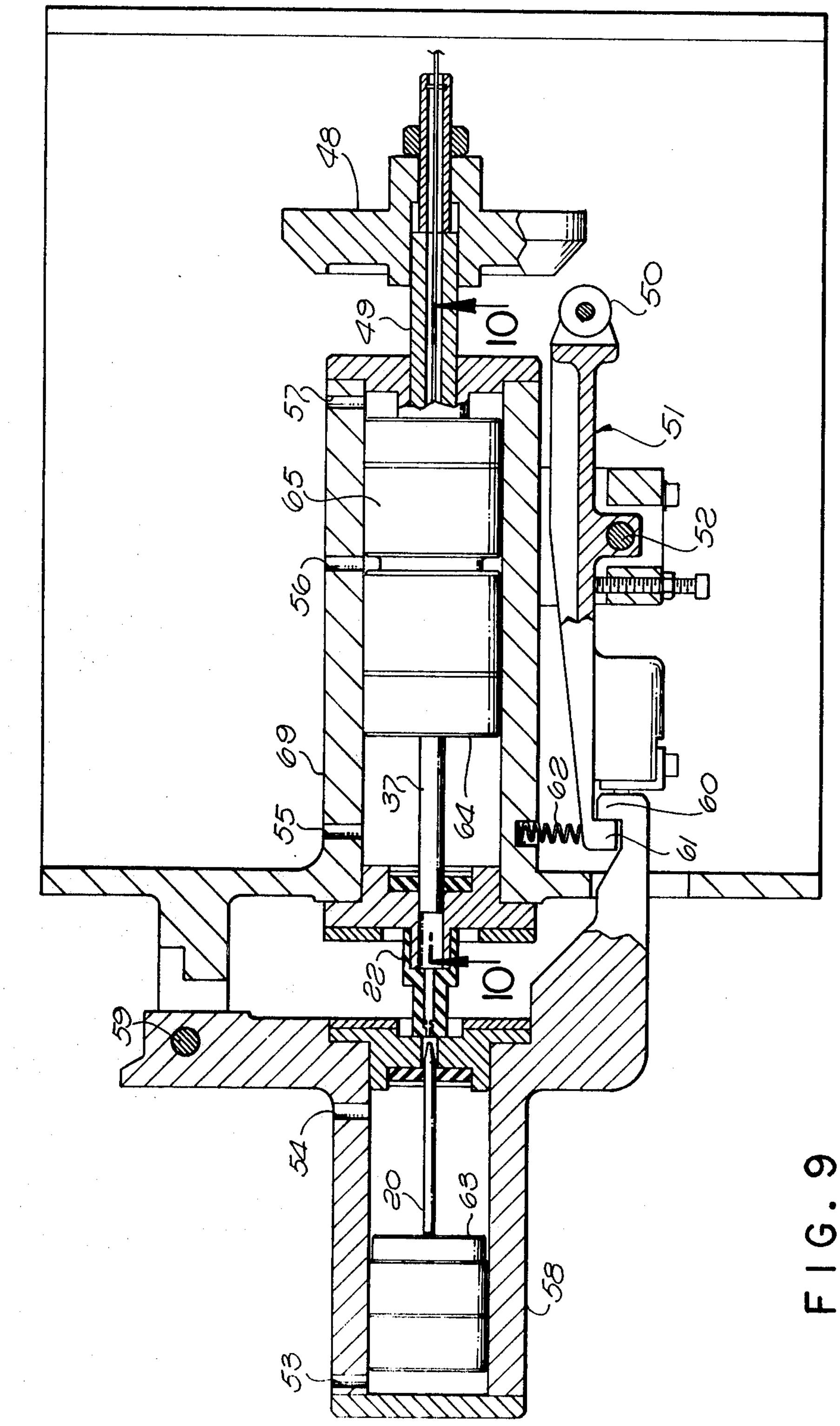
FIG. 9 is a sectional view of the apparatus taken on the line 9—9 shown in FIG. 8.

A beveled disk 48 is provided on a shaft 49 shown in FIG. 9. Disk 48, when moved to the left as viewed in FIG. 8, touches a follower 50 on a rocker arm 51 that pivots about a pin 52. See also FIG. 9.

The apparatus shown in FIG. 9 is operated pneumatically through ports 53, 54, 55, 56 and 57. A body 58 is rotatable about a pin 59 and has a hook 60 that latches with a hook 61 at the left end of rocker arm 51. Hooks 60 and 61 are held together by a spring 62.

Figure 10:
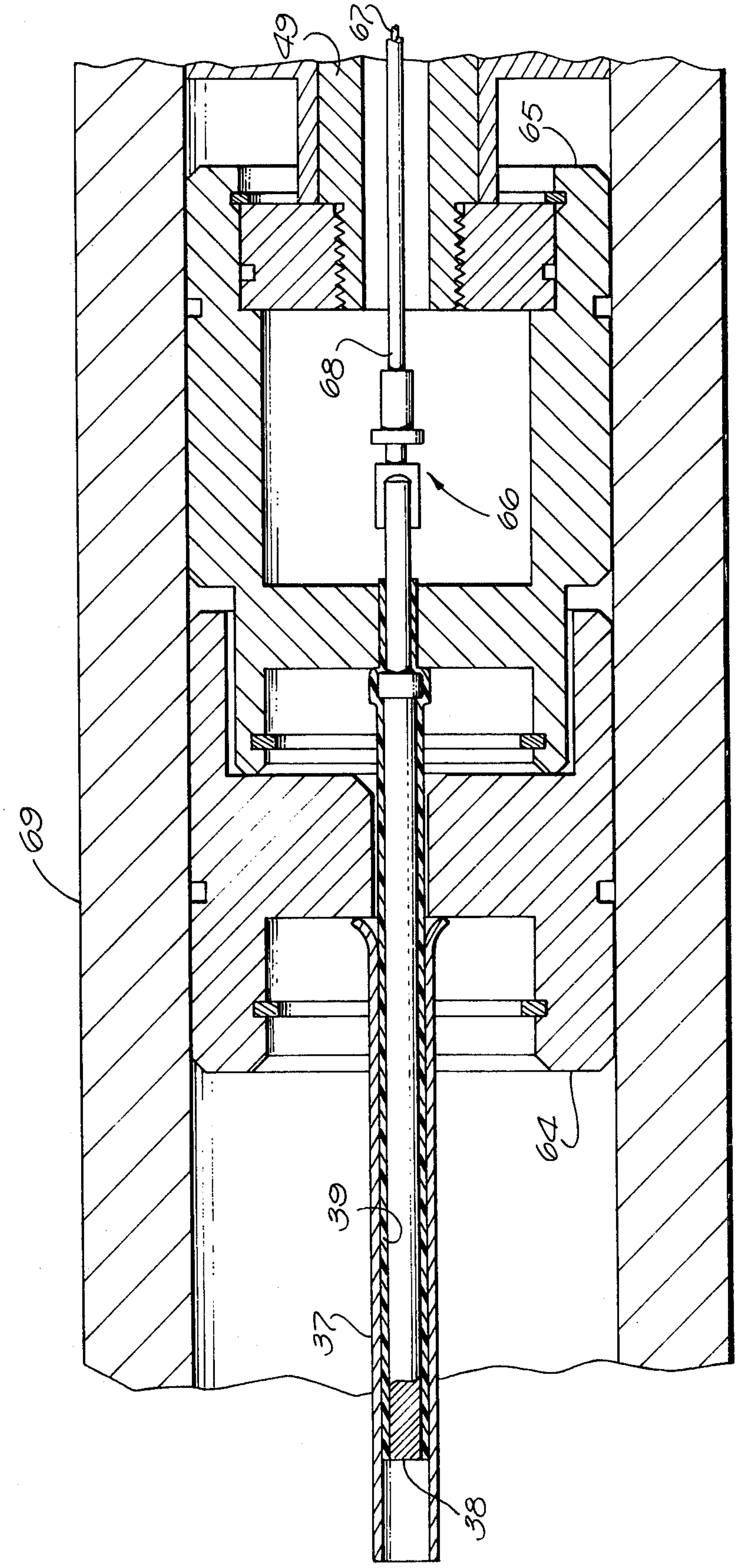
FIG. 10 is an enlarged longitudinal sectional view of the apparatus taken on the line 10—10 shown in FIG. 9.

In the operation of the apparatus shown in FIG. 9, a piston 63 carries shaft 20. See FIG. 1. Insulator 22 is also shown in FIG. 9. The same is true of cylinder 37 shown in FIGS. 3, 4, 5 and 6. Cylinder 37 is carried by a piston 64. As shown in FIG. 10, rod 38 and insulation 39 are carried by a piston 65. An electrical connection is made at 66 from conductor 67 of a wire having insulation at 68. Pistons 64 and 65 are carried inside a barrel 69.

In the operation of the apparatus shown in FIGS. 8, 9 and 10, piston 63 is moved to the right to cause shaft 20 to enter the central opening in insulator 22. Piston 64 is then moved to the left to cause cylinder 37 to slide in between shaft 20 and the internal surface of insulator 22. Piston 63 is moved to the left retracting shaft 20 from cylinder 37. Rod 38 with insulation 39 therearound is then slidably moved by piston 65 to the position shown in FIG. 5. In this case, disk 48 engages follower 50. This rotates rocker arm 51 clockwise about shaft 52, and parts 60 and 61 are disconnected. Body 58 then rotates clockwise about pin 59. Manually, contact 29 shown in FIG. 5 is placed inside cylinder 37 until it touches the left end of rod 38, and electrically shorts rod 38 to inside surface of cylinder 37. In this case, piston 64 or piston 65, or both of them, may be moved pneumatically as shown in FIG. 9 by venting ports 56 and 57 to the atmosphere and injecting air under pressure through port 55 inside barrel 69 thereby retracting cylinder 37 and rod 38 from insulator 22. The assembly of FIG. 7 may thus be constructed. The assembly of FIG. 7 may be modified by changing the right end of contact 29 to a socket or any electrical conductor rather than to the pin shown if desired.

Figure 11:
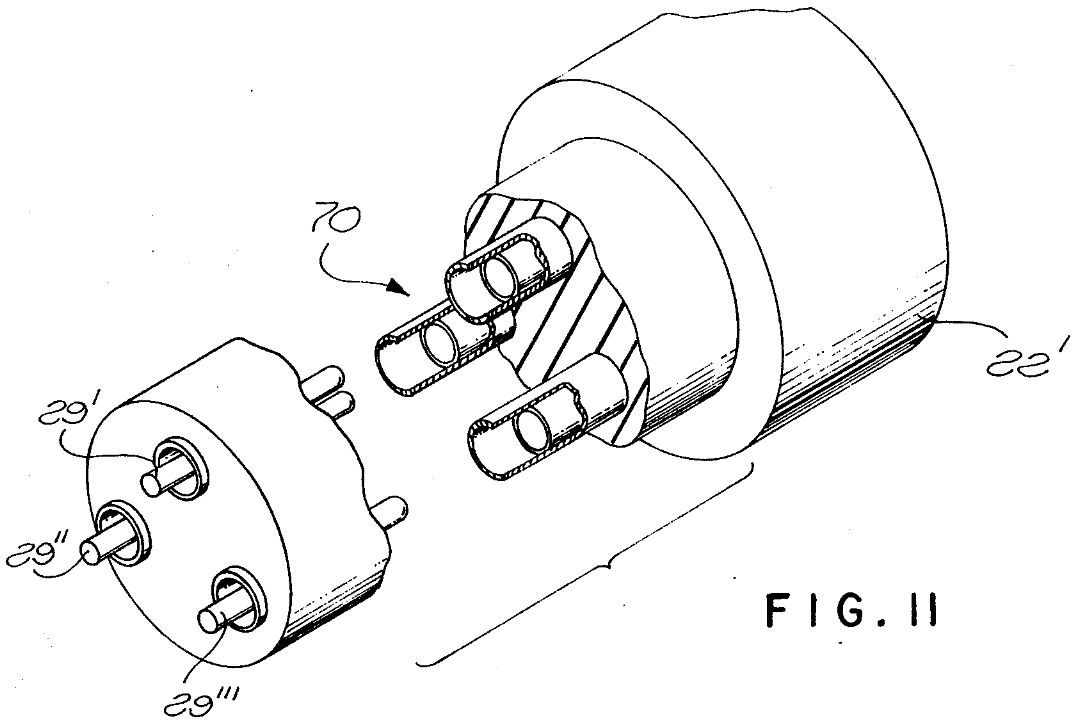
FIG. 11 is a broken away perspective view of an alternative embodiment of the present invention.

An insulator 22′ is shown in FIG. 11 that is similar to insulator 22 in FIG. 1, but has three sets of bores which may be identical to bores 23-26 shown in FIG. 1. Three contacts may thus be assembled to insulator 22′ instead of one as at 29 in insulator 23 shown in FIG. 7. The three insulators are shown in FIG. 11 at 29′, 29″ and 29‴.

Figure 12:
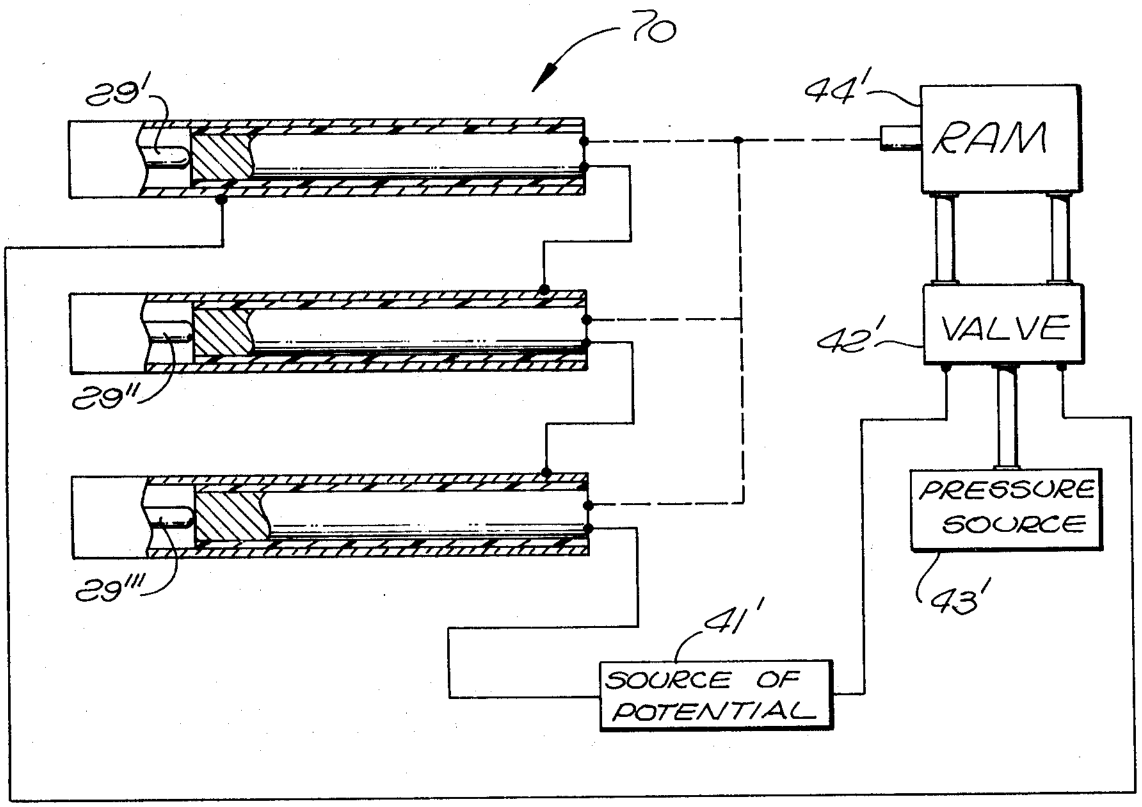
FIG. 12 is a diagrammatic view of the present invention somewhat similar to FIG. 5, but constructed to be employed with the alternative embodiment of FIG. 11.

The arrangement of cylinder 37, rod 38 and insulation 39 (FIG. 5) is the same for each contact 29′, 29″ and 29‴ as indicated by assembly 70 in both of the FIGS. 11 and 12. However, the contacts 29′, 29″ and 29‴ are arranged and the rods and cylinders of assembly 70 are wired so that lead 71 is not connected to source 41′ unless each of contacts 29′, 29″ and 29‴ is connected between its corresponding rod and cylinder.

Sources 41′ and 43′ may be identical to sources 41 and 43, if desired. Similarly, ram 44′ may be identical to ram 44, and valve 42′ may be identical to valve 42.

We claim:

1. The method of fabricating an electrical connector, said method comprising the steps of: supporting a resilient insulator, said insulator having a hole therethrough; telescoping hollow cylinder means into said insulator hole to stretch said hole to a position larger than its unstressed cross section; telescoping cylindrical insulator covered rod means partway into said cylinder means; and creating an electrical short between one end of said rod means and said cylinder means with an electrical contact to cause said insulator to be relieved in a manner to allow the same to contract upon and to hold said contact fixedly in inward radial compression in said insulator hole.

2. The method of fabricating an electrical connector, said method comprising the steps of: supporting a resilient insulator, said insulator having a plurality of holes therethrough; telescoping hollow cylinder means into each said insulator hole to stretch each said hole to a position larger than its unstressed cross section; telescoping cylindrical insulator covered rod means partway into each said cylinder means; and creating an electrical short between each said rod means and a respective corresponding cylinder means with a plurality of respective electrical contacts to cause a mechanism to move said cylinder means in a manner to allow said insulator to contract upon and to hold all of said contacts fixedly in inward radial compression in said respective insulator holes, all of said rods being shorted to all of the respective corresponding cylinder means at the same time.

3. Electrical connector fabrication apparatus, said apparatus comprising: a support for a resilient insulator, said insulator having a hole therethrough; a first reciprocable mechanism for telescoping a hollow cylinder means into said insulator hole to stretch said hole to a position larger than its unstressed cross section; a second reciprocable mechanism for telescoping cylindrical insulator covered rod means partway into said cylinder means; and a third electrically operable mechanism responsive to the placing of a contact in a position creating an electrical short between one end of said rod means and said hollow cylinder means to actuate said first mechanism to relieve said insulator in a manner to allow the same to contract upon and to hold said contact fixedly in inward radial compression in said insulator hole.

4. Electrical connector fabrication apparatus, said apparatus comprising: a support for a resilient insulator, said insulator having a plurality of holes therethrough; a first reciprocable mechanism for telescoping hollow cylinder means into each respective one of said insulator holes to stretch said holes to positions larger than their unstressed cross sections; a second reciprocable mechanism for telescoping cylindrical insulator covered rod means partway into each said cylinder means and said insulator; and a third electrically operable mechanism responsive to the creating of an electrical short by placing each of a plurality of contacts in engagement with one end of each of said rod means and each corresponding one of said hollow cylinder means to actuate said first mechanism to relieve said insulator in a manner to allow the same to contract upon and to hold all of said contacts fixedly in inward radial compression in said respective insulator holes.

* * * * *